United States Patent [19]

Mueller

[11] Patent Number: 4,485,993

[45] Date of Patent: Dec. 4, 1984

[54] POCKET STRUCTURE FOR A FOLDABLE WING OF AN AIRCRAFT

[75] Inventor: Guenther Mueller, Gauting, Fed. Rep. of Germany

[73] Assignee: Messerschmitt-Boelkow-Blohm Gesellschaft mit beschraenkter Haftung, Munich, Fed. Rep. of Germany

[21] Appl. No.: 544,785

[22] Filed: Oct. 24, 1983

[30] Foreign Application Priority Data

Oct. 30, 1982 [DE] Fed. Rep. of Germany ....... 3240260

[51] Int. Cl.³ .......................... B64C 3/40; B65D 37/04
[52] U.S. Cl. ................................. 244/135 B; 244/46; 244/130
[58] Field of Search ........... 244/135 R, 135 B, 137 R, 244/130, 46, 49, 118; 220/6, 85 B, 461

[56] References Cited

U.S. PATENT DOCUMENTS 2,806,665  9/1957  Gibson ........................ 244/135 B
4,214,721  7/1980  Burhans, Jr. et al. ......... 244/135 B

FOREIGN PATENT DOCUMENTS 2916662  6/1981  Fed. Rep. of Germany .

Primary Examiner—Galen L. Barefoot
Attorney, Agent, or Firm—W. G. Fasse; D. H. Kane, Jr.

[57] ABSTRACT

The pocket structure for a foldable wing of an aircraft, especially a high performance aircraft, is constructed at least partially of flexible material forming a completely closed volume with an inward fold for receiving a wing portion. The fold divides the closed volume into two portions which are interconnected outside the reach of the fold to form an auxiliary fuel tank for the aircraft. The pocket structure has sealing lips extending along both of its outwardly facing side walls. The sealing lips are constructed as two bellows which are filled with a gas under pressure. Thus, the lips perform two functions. First, the lips seal a zone below the wing from a zone on top of the wing to maintain the pressure difference. Second, the lips strengthen and protect the outwardly facing side walls of the wing pocket structure forming an auxiliary fuel tank. The pocket also performs two functions, namely, the wing receiving function and the tank function.

8 Claims, 5 Drawing Figures

POCKET STRUCTURE FOR A FOLDABLE WING OF AN AIRCRAFT

BACKGROUND OF THE INVENTION

1. Field of the Invention

The invention relates to a pocket structure for a foldable wing of an aircraft, especially a high performance aircraft such as a military aircraft. Such pocket structures are located in a space of the aircraft fuselage for receiving at least a portion of a wing when the latter is folded back during high speed flight.

2. Description of the Prior Art

Pocket structures in the form of pocket bellows are known in connection with foldable wing aircraft. These pocket bellows perform two functions, one function is the sealing of the wing top surface from the wing bottom surface so as not to impair the pressure difference between these two surfaces. The other function of the pocket bellows is to maintain or provide a closed outer fuselage contour to satisfy aerodynamic requirements.

German Patent (DE-PS) No. 2,916,662 discloses flexible pocket structures functioning as fuel tanks located in the hollow spaces between the launching tubes of a clustering weapons container on an aircraft. Such fuel tanks change their volume. This prior art system according to German Pat. No. 2,916,662 is not suitable for wing pockets because the primary function of a wing receiving bellows is the sealing function for maintaining the pressure difference between the top and bottom surfaces of a wing. Such sealing function is not critical in a scattering weapons container.

OBJECTS OF THE INVENTION:

In view of the foregoing it is the aim of the invention to achieve the following objects singly or in combination:

to construct wing receiving pocket bellows in such a manner that the space enclosed by the bellows and not needed for receiving the wing itself, is available for useful purposes;

to construct the wing receiving bellows as a fuel tank;

to make sure that the internal volume of the wing receiving bellows outside the portion which receives the wing proper, remains substantially constant independently of the extent to which a wing moves up or down inside a pocket;

to construct a wing receiving pocket in such a manner that its features will simultaneously satisfy the sealing requirements along the upper and lower wing surfaces as well as the utilization requirements, for example, of a fuel tank; and to protect the surfaces of the pocket structure which are in frictional contact with a folding wing against wear and tear.

SUMMARY OF THE INVENTION

The pocket structure according to the invention has flexible walls forming a fold reaching into an otherwise closed volume which forms a fuel tank which is separated from the sealing lip means extending along out facing side walls of the pocket structure. In a preferred embodiment the sealing lips comprise two bellows which are separate from the fuel tank volume and which are expandable by a gas under pressure for the sealing purpose while simultaneously reinforcing the outwardly facing side walls of the pocket structure.

It is an advantage of the invention that the space of the pocket structure which heretofore went unused, now adds approximately 500 liters to the fuel tank capacity of a high performance military aircraft.

BRIEF FIGURE DESCRIPTION

In order that the invention may be clearly understood, it will now be described, by way of example, with reference to the accompanying drawings, wherein.

DETAILED DESCRIPTION OF PREFERRED EXAMPLE EMBODIMENTS AND OF THE BEST MODE OF THE INVENTION

Figure 1:
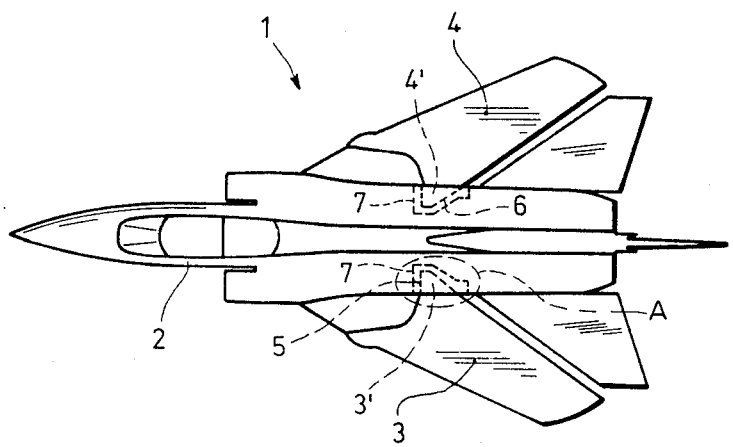
FIG. 1 is a stylized top plan view of a foldable wing aircraft.

The foldable wing aircraft 1 shown in FIG. 1 has a fuselage 2 and foldable wings 3 and 4 shown in their folded-in position during high speed flight, whereby portions 3' and 4' of these foldable wings 3, 4 extend into respective pocket structures 5 and 6 extending into respective spaces inside the fuselage 2 on each side of the aircraft. A dashed line A encircles a portion in FIG. 1 which is shown on an enlarged scale in FIG. 2.

Figure 2:
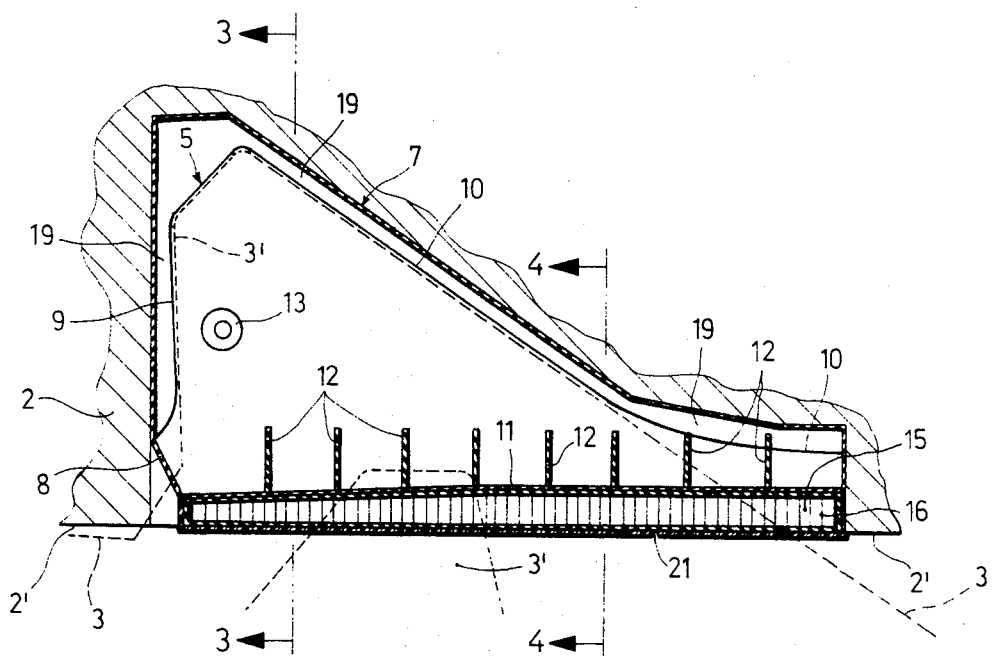
FIG. 2 is an enlarged view of the portion A encircled with dashed lines in FIG. 1.

FIG. 2 shows one pocket structure on the left side of the fuselage. The pocket structure on the right side of the fuselage is mirror-symmetrically the same as the one on the left side. Therefore, only one structure will be described.

The fuselage 2 is shown broken away in FIG. 2 so as to expose a recess 7 in which the pocket structure 5 is received. The wing portion 3' and the wing 3 are shown in dashed lines in FIG. 2 in different positions. When the wing is fully folded, it substantially fills the pocket structure 5. On the other hand, when the wing is unfolded, for example, for low speed flight or landing operations, only the wing portion 3' reaches slightly into the pocket structure 5.

The pocket structure 5 is made of a rubber elastic or elastomeric, flexible material which has inwardly reaching wall portions 8, 9 and 10 as well as outwardly facing side walls 11. Reinforcing and shape stabilizing wall elements 12 reach inwardly away from the side walls 11. These reinforcing stabilizing wall elements 12 form compartments which are completely open inwardly to communicate with the inner volume of the pocket structure. A fuel inlet 13 is symbolically shown on top of the pocket structure so that the volume enclosed by the pocket structure may be used as a fuel tank according to the invention. A sealing lip 14 in the form of a bellows 15 is arranged alongside and in abutment with the outwardly facing side wall 11 of the pocket structure. The bellows 15 has wall members 16 extending substantially perpendicularly to the length of the respective bellows. The wall members 16 define the cross-sectional shape of the respective bellows 14. Such cross-sectional shape may vary along the length of the bellows 15, said length extending in parallel to the side wall 2' of the fuselage 2.

Figure 3:
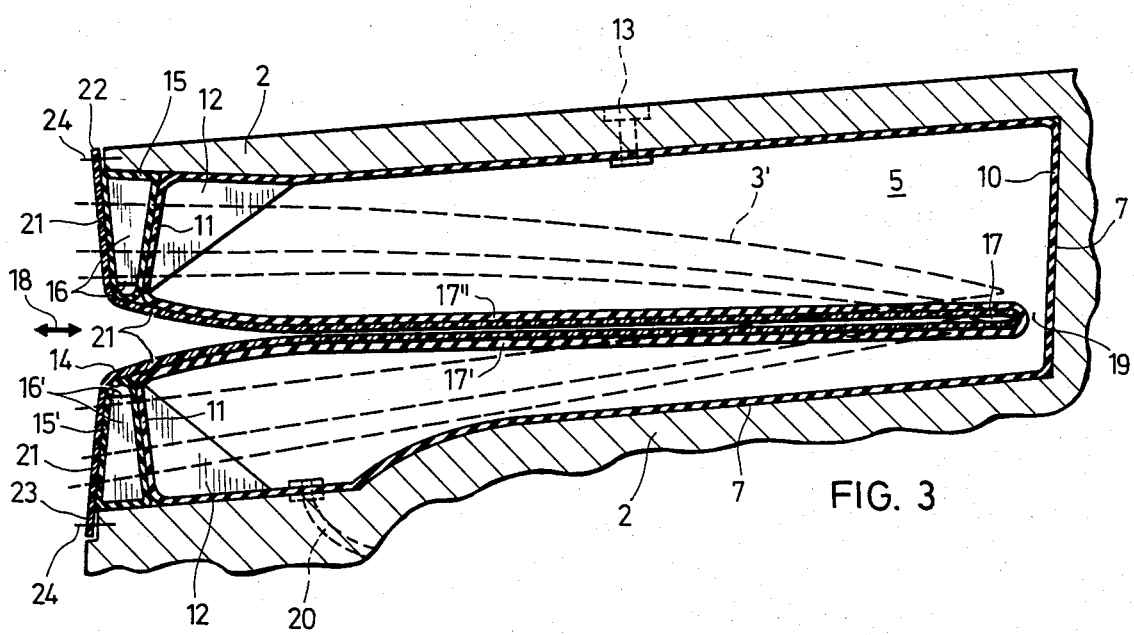
FIG. 3 is a sectional view along section line 3—3 in FIG. 2.

As best seen in FIG. 3 the pocket structure 5, or rather the flexible wall means thereof, form a completely enclosed volume separated into two volume portions by an inwardly extending fold 17 having a lower surface 17' and an upper surface 17". The surfaces 17' and 17" face a wing portion 3' as the latter moves into and out of the fold 17 in the direction of the double arrow 18. The fold 17 does not completely separate the pocket structure into two separate volume portions. Rather, the volume portions remain interconnected through a passage 19 between the inner end of the fold 17 and the wall portion 10 of the pocket structure 5. Thus, the total volume remains substantially the same including the fuel volume even if a wing portion 3' enclosed in the fold 17 should be moving vertically up or down as indicated by the several dashed line positions of the wing portion 3' in FIG. 3. Therefore no fuel is lost overboard or has to be forgone due to this wing action.

A fuel outlet valve 20 is connected preferably to the lowest point of the fuel tank volume of the pocket structure 5. The details of the fuel inlet 13 and the fuel outlet 20 are not shown since they are conventional. Two sealing bellows 15 and 15' are shown in abutment with the outwardly facing side walls 11 of the pocket structure 5. Each bellows 15, 15' has its respective cross wall members 16 and 16'. Preferably, the wing contacting surface portions of the fold forming lower fold wall 17' and of the fold forming upper fold wall 17" as well as the outer surfaces of the bellows 15 and 15' are covered or coated with a wear resistant layer such as a Teflon coating 21. Each bellows 15, 15' is provided with a respective extension flange 22 and 23 which is secured to the respective fuselage wall, for example, by riveting or the like as symbolically indicated at 24 for sealing and reinforcing and for fixation of the bellows.

Figure 4:
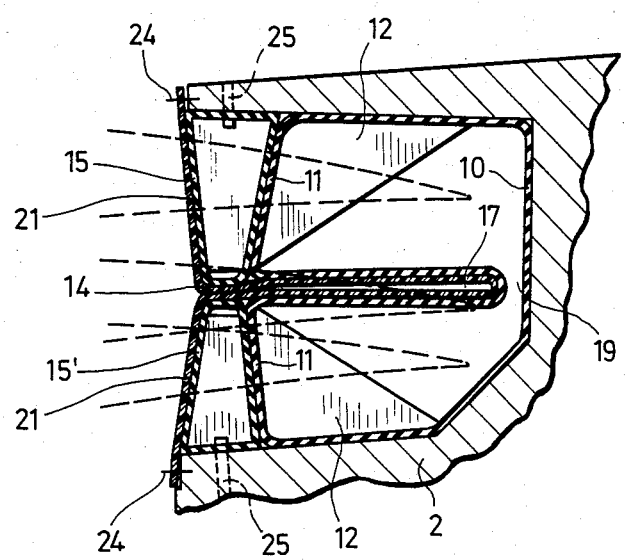
FIG. 4 is a sectional view along section line 4—4 in FIG. 2.

The same reference numbers are used in FIG. 4 as in FIG. 3 for designating the same elements. FIG. 4 further shows the valve means 25 for introducing a gas such as air under pressure into the bellows 15, 15' to stiffen the same for their sealing function against the air flow pressure as well as against flutter.

Figure 5:
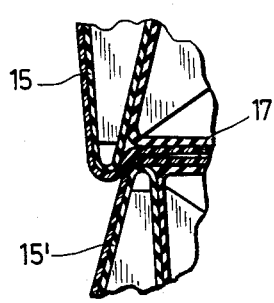
FIG. 5 is a view similar to that of FIG. 4, but showing a modification with overlapping sealing bellows.

In order to accommodate and to seal off the shape of the wing there may be a certain squeezable vertical overlap not shown between the upper bellows 15 and the lower bellows 15' of the sealing lips in the longitudinal direction defined by the fuselage wall 2'. Alternatively, but not preferably the overlap may also be in the lateral direction as shown in FIG. 5. As shown in FIG. 3 the sealing lips 15, 15' in the forward area of the pocket structure do not touch each other as the forward portion of the wing never completely vacates this area during folding operation. Therefore sealing can be assured by defined vertical dimensions of the sealing lips.

As mentioned, the wall elements 12 stabilize the shape of the pocket structure 5, especially along its outwardly facing side walls 11. The pocket forming fold 17 abuts with its outwardly facing side walls 11 flexibly against the sealing lip bellows, whereby the fold 17 is movable vertically up and down for accommodating respective movements of a wing in the fold 17 without varying the total volume of the pocket structure 5 while simultaneously permitting the sealing lip bellows 15 and 15' to perform their sealing function as well as their reinforcing function along the side walls 11 of the pocket structure 5. The bellows 15, 15' have such a vertical dimension that there may be an overlap, at least along a portion of the length of the bellows for accommodating the wing shape and for assuring a proper seal at all times even when the wing is withdrawn from the fold 17.

Preferably, the walls of the pocket structure 5 and the bellows 15, 15' are made of different, yet flexible materials. The pocket structure 5 is preferably made of fuel resistant elastomeric material, e.g. nitrile rubber. The bellows are preferably made of high and low temperature resistant rubber, e.g. silicon rubber. The wear resistant coating 21 is preferably made of Teflon (RTM).

Although the bellows 15, 15' are provided with wall members 16, 16', these wall members still permit a complete communication of any pressurized gas throughout the volume of the bellows, for example, by providing these wall members 16 with holes not shown.

It has been found that the bellows 15, 15' may have a rather narrow horizontal dimension while still being able to provide the sealing function as well as the reinforcing function along the outwardly facing side walls 11 of the pocket structure. This feature is enhanced by the stabilizing wall elements 12 so that the volume available for the fuel tanks is optimized, while still assuring the desired protection of the side walls 11 by the stabilizing wall elements 12 and by the bellows 15, 15'. Further, the vertical extension of the bellows is such that a reliable sealing is assured, even under substantial wing bending in response to respective substantial g-loads. Even if the fuel tank is completely empty, the sealing function of the sealing lip bellows 15, 15' is assured due to their vertical dimensions and due to their pressurization. Further, by placing the inlets 13 for the fuel at the top of the tank and the outlets 20 at the bottom of the tank, the latter may be completely emptied solely by gravity.

It has been found that providing an additional fuel capacity of about 500 L is a substantial advance in high performance military aircraft because such aircraft are conventionally very limited in the space that is available for fuel tank purposes. If the fuel tank portions above and below of the pocket structure are conveniently located, the additional or auxiliary fuel tank space provided according to the invention may be directly connected to the conventionally provided fuel tank space by respective conventional connecting means such as valves and the like.

Although the invention has been described with reference to specific example embodiments, it will be appreciated, that it is intended, to cover all modifications and equivalents within the scope of the appended claims.

What is claimed is:

1. A pocket structure for a foldable wing of an aircraft, comprising wall means including outwardly facing side walls forming a closed volume of given shape, fuel flow means operatively connected through said wall means into said closed volume for using said closed volume as a fuel tank, said wall means including a pocket forming fold for receiving at least a portion of an aircraft wing, said fold of said wall means extending into said volume between said outwardly facing side walls, said pocket structure further comprising separate sealing lip means extending along each outwardly facing side wall of said closed volume forming wall means above and below a wing for sealing a zone above the wing from a zone below the wing for maintaining a pressure difference.

2. The pocket structure of claim 1, wherein said separate sealing lip means comprise two bellows and means for filling said bellows with a pressurized gas, each of said bellows comprising wall members extending substantially perpendicularly to the length of the respective bellows, said wall members defining the cross-sectional shape of said bellows.

3. The pocket structure of claimm 1, wherein said wall means comprise shape stabilizing wall elements for said closed volume, said wall elements extending from said outwardly facing side walls inwardly for reinforcing the shape of said volume forming said fuel tank.

4. The pocket structure of claim 1, wherein said pocket forming fold abuts flexibly with its open end against said sealing lip means and wherein said fold has a free end reaching into said volume whereby said fold is movable vertically up and down for accommodating respective movements of a wing in said fold without varying said volume forming said fuel tank.

5. The pocket structure of claim 1, wherein said separate sealing lip means comprise two bellows and means for filling said bellows with a pressurized gas, said bellows extending alongside each other in the vertical direction and having a vertical dimension such that there is an overlap between the two bellows when a wing is withdrawn from said fold, said bellows resting flexibly yet tightly against the surfaces of a wing extending into said fold.

6. The pocket structure of claim 1, wherein said wall means and said lip means are made of different materials.

7. The pocket structure of claim 1, further comprising a wear and tear resistant layer on all surfaces of said fold and on said lip means coming into contact with a wing.

8. The pocket structure of claim 1, wherein said wear and tear resistant layer is a coating of Teflon (RTM).

* * * * *